(12) United States Patent
McKane

(10) Patent No.: US 7,614,427 B2
(45) Date of Patent: Nov. 10, 2009

(54) CABLE ROUTING CONDUIT

(76) Inventor: James H. McKane, 22481 Sunbrook, Mission Viejo, CA (US) 92692

( * ) Notice: Subject to any disclaimer, the term of this patent is extended or adjusted under 35 U.S.C. 154(b) by 0 days.

(21) Appl. No.: 12/079,745

(22) Filed: Mar. 28, 2008

(65) Prior Publication Data

US 2009/0242066 A1  Oct. 1, 2009

(51) Int. Cl.
*F16L 11/00* (2006.01)
(52) U.S. Cl. .................. 138/110; 138/121; 138/156; 138/128; 174/117 A; 248/205.3
(58) Field of Classification Search .............. 138/121, 138/122, 110, 156, 128; 174/97, 117 A; 248/73, 74.2, 74.1, 205.2, 205.3, 205.6, 316.7; 24/306, 339
See application file for complete search history.

(56) References Cited

U.S. PATENT DOCUMENTS

| | | | | |
|---|---|---|---|---|
| 2,704,302 | A * | 3/1955 | Budd | 174/175 |
| 2,885,460 | A * | 5/1959 | Borresen et. al. | 174/70 C |
| 3,409,257 | A * | 11/1968 | Elm | 248/65 |
| 3,491,971 | A * | 1/1970 | Fisher | 248/65 |
| 3,576,304 | A * | 4/1971 | Gillemot et al. | 248/74.2 |
| 3,809,799 | A * | 5/1974 | Taylor | 174/68.3 |
| 3,965,782 | A | 6/1976 | Leloux | |
| 4,136,848 | A * | 1/1979 | McCollum | 248/316.7 |
| 4,260,123 | A * | 4/1981 | Ismert | 248/74.1 |
| 4,293,752 | A * | 10/1981 | Koenig | 200/295 |
| 4,530,865 | A * | 7/1985 | Sprenger | 428/35.7 |
| D354,904 | S * | 1/1995 | Halsten | D8/356 |
| 5,396,789 | A | 3/1995 | Castellon | |
| 5,820,095 | A * | 10/1998 | Stone | 248/316.7 |
| 5,832,960 | A * | 11/1998 | Amatsutsu et al. | 138/110 |
| 6,392,147 | B1 * | 5/2002 | Hier et al. | 174/70 C |

OTHER PUBLICATIONS

McMaster-Carr; "Barbed Tube Fittings" p. 137.
EN.WIKIPEDIA.ORG; "Extrusion"; Jan. 10, 2008; 3 pgs.
WWW.MCMASTER.COM; "Sleeving"; Dec. 26, 2007; 3 pgs.
WWW.MCMASTER.COM; "Tubing"; Dec. 26, 2007; 2 pgs.

* cited by examiner

*Primary Examiner*—Patrick F Brinson
(74) *Attorney, Agent, or Firm*—Stetina Brunda Garred & Brucker

(57) ABSTRACT

A flexible conduit for routing cable between a source and destination is provided herein. The flexible conduit may have a corrugated cover portion and a generally flat attachment portion for attaching the flexible conduit to an attachment surface or nearby structure. It is contemplated that the flexible conduit may flex in the lateral and/or vertical direction such that the flexible conduit may be intricately routed between the source and destination. It is also contemplated that the attachment portion may be directly attached (e.g., pressure sensitive adhesive, hooks and loops, etc.) to the attachment surface to allow ease of installation without the use of tools. It is also contemplated that the elongate hollow body of the conduit may exhibit a slit opening opposite the attachment portion of the conduit to facilitate non-destructive installation and removal of the cables. It is also contemplated that the attachment portion may be attached to the attachment surface with screws.

17 Claims, 6 Drawing Sheets

CABLE ROUTING CONDUIT

CROSS-REFERENCE TO RELATED APPLICATIONS

Not Applicable

STATEMENT RE: FEDERALLY SPONSORED RESEARCH/DEVELOPMENT

Not Applicable

BACKGROUND

The present invention relates to a cable routing conduit for organizing a plurality of cables.

Computers have cables that route different information to various components of the computer system. By way of example and not limitation, a computer system may have a monitor cable that routes information between the monitor and a computer tower, a keyboard cable that transmits information between the keyboard and the computer tower, and a printer cable that routes information between the computer tower and the printer. Desktop computers may additionally have a mouse cable that runs between the mouse and the computer tower. The cables route the information between the respective components and the computer tower to interconnect and interoperate the various components to work as one. Unfortunately, the number of cables also increases the clutter on or around a person's desk. Accordingly, the cables for operating the computer system may be disorganized and interfere with the user's work. Moreover, during maintenance, IT personnel may have difficulty in tracing the pertinent cable at issue.

Other electronic components require cables such as cell phones for charging the battery of the cell phone. Typically, households may have at least one cell phone per adult. Accordingly, the household may have a plurality of charger cables that extend from a wall outlet to a table top. The charging cables may create clutter that detracts from the aesthetic beauty of the person's home. Another example of an electronic component that requires cables is a television. It appears that almost inevitably the television is placed at a point in the room that is furthest from the TV cable connection or the electrical outlet. The TV cable or the electric cord extending between the television and their respective wall outlets detract from the aesthetic beauty of the person's home. Also, wall mounted flat screen televisions challenge the owner to hide the cable in the wall, leave the cables to hang loose or somehow fasten them to the adjacent wall.

To alleviate the above-identified problems with cable clutter, some computer systems have gone wireless. However, even so-called wireless components interact with sending units through wires connected to the personal computer. Also, prior art cable conduits have been introduced into the market place. For example, a split corrugated tubing permits cables to be inserted into the tubing to organize the cables. The split corrugate tubing may have a slit on one side of the tubing to allow the cable(s) to be pushed through the slit and into the tubing or pulled out of the tubing via the slit.

The split corrugated tubing may be attached to a nearby structure with wire ties. In particular, the split corrugated tubing may be laid adjacent to a leg of a desk. With the cables within the split corrugated tubing, wire ties are wrapped or disposed around the leg and the split corrugated tubing. The wire ties are then twisted to attach the split corrugated tubing to the leg or post of the desk. Unfortunately, in this scenario, to insert or remove a cable from the split corrugated tubing, all of the wire ties must be removed. Accordingly, prior art methods of attaching the split corrugated tubing to the structure present many limitations during installation and maintenance of electronic components.

Another limitation in hiding the cables of electronic components is that prior art devices may require nails and other destructive means. For example, the cables may be hidden by coverings (e.g., molding, etc.) nailed to the dry wall. Attempting to route and hide the multiple cables included with wall mounted flat screens usually necessitates the damage and repair of the surrounding drywall and/or the use of drywall fasteners which damage the drywall. This is unacceptable in most home or apartment rental situations and cumbersome and expensive in any situation. Unconcealed, uncontrolled, wall mounted flat screen television cables are an aesthetically intolerable issue that creates an expensive nuisance especially for the new unprepared TV buyer. Nonetheless, typically, cables for flat screen televisions are hidden by molding due to the extensive labor required to hide the cables within the wall which in apartment situations may be unacceptable.

Accordingly, there is a need in the art for an improved flexible cable routing conduit.

BRIEF SUMMARY

The cable routing conduit discussed herein addresses the issues discussed above, discussed below and those that are known in the art.

The cable routing conduit may be comprised of a cover portion and an attachment portion. The cover portion may have a generally semi-circular shape with corrugation extending along a length of the cable routing conduit. The corrugation allows vertical and horizontal bending of the conduit. The cover portion may be attached to an attachment portion. The attachment portion may be generally flat with an attachment means for attaching the flexible conduit to an attachment surface. The attachment means may include a pressure sensitive adhesive or a hooks and loops system. The attachment portion may additionally have a straight relief or a triangularly shaped relief for permitting lateral bending of the flexible conduit. If the straight relief or triangularly shaped relief is incorporated into the attachment portion of the flexible conduit, then the flexible conduit may be operative to bend in a lateral direction.

A plurality of flexible conduits may be connected to each other by means of a fitting. The fitting may receive adjacent flexible conduits or be received into adjacent flexible conduits. The fittings may also be straight or bent. Alternatively, the flexible conduit may have a cylindrical nub portion which is receivable into a distal end portion of an adjacent flexible conduit. It is also contemplated that the flexible conduits may be butted up against each other, as required. The attachment means of the flexible conduits would hold the adjacent flexible conduits in alignment with each other during use.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

Referring now to FIGS. 1-5, a conduit 10 for routing cable 12 is shown. The conduit 10 may be attached to an attachment surface 14 (e.g., wall, floor, computer box, etc.). The cable 12 may be disposed within the conduit 10 to neatly organize the cable 12 or cables 12. Moreover, since the conduit 10 may be bendable, the cables may be routed in a complex configuration to guide the cables 12 from a source (e.g., computer tower) to a destination (e.g., table top). The conduit 10 may be bent (e.g., 90 degrees) vertically and/or laterally so as to be attachable to the floor and wall then to an underside of a tabletop. Accordingly, the cables 12 are not disorganized under the table, but are rather neatly confined within the cable routing conduit 10.

Figure 1:
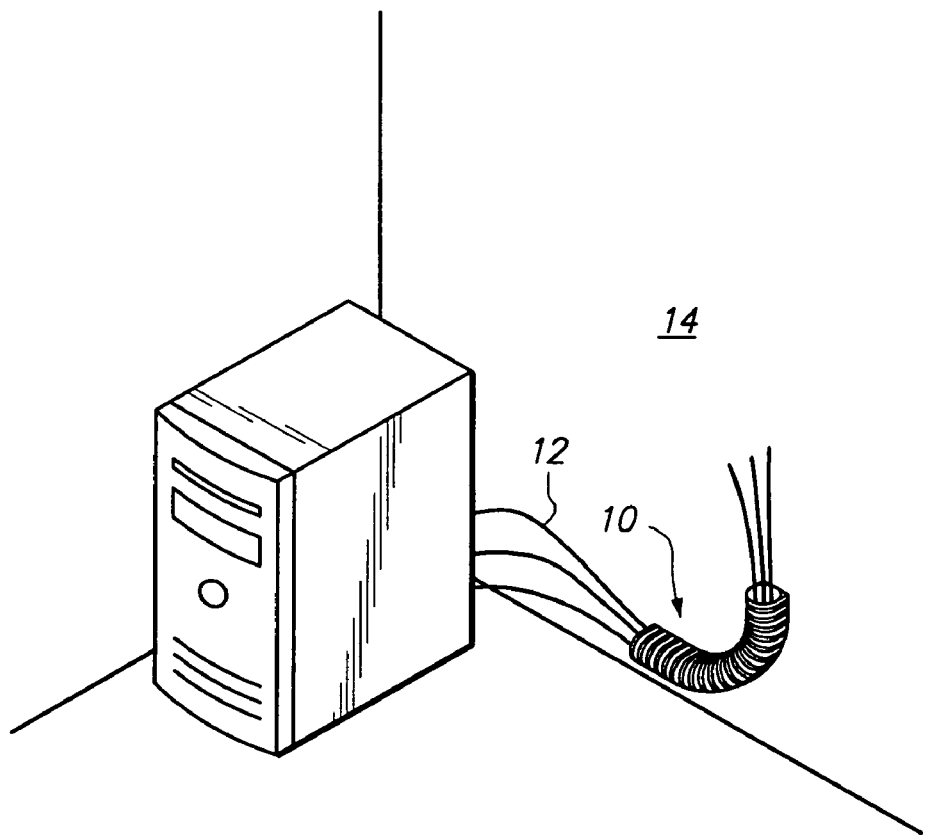
FIG. 1 is a perspective view of a cable routing conduit for neatly organizing electronic cables behind a computer tower.
Figure 2:
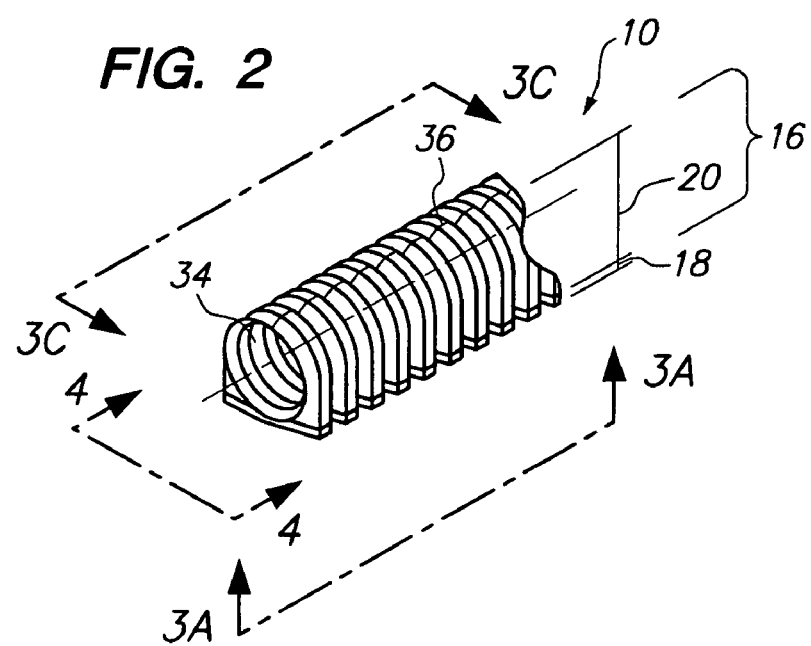
FIG. 2 is an uninstalled cable routing conduit.

Referring now to FIG. 2, a perspective view of the conduit 10 is shown. The conduit 10 may have an elongate hollow body 16. The elongate hollow body 16 may have a generally flat attachment portion 18. The attachment portion 18 may be utilized to attach the elongate hollow body 16 to the attachment surface 14, as will be discussed below. The elongate hollow body 16 may also have a cover portion 20. The cover portion 20 may have a corrugated configuration which aids in the lateral and/or vertical bending of the conduit 10. The corrugated configuration is shown in FIG. 2. Although the cover portion 20 may be corrugated, it is also contemplated that the cover portion 20 may have a spiral corrugation or a smooth configuration.

Figure 3A:
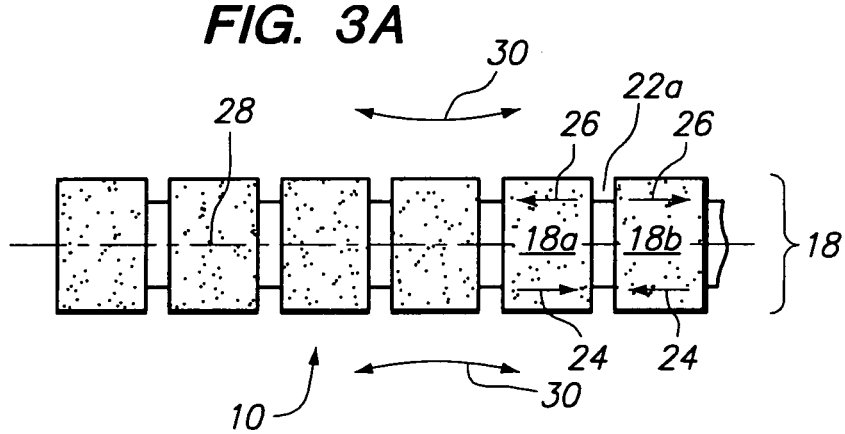
FIG. 3A is a bottom view of an attachment portion of the cable routing conduit.

To further aid in the lateral and/or vertical bending of the conduit 10, the attachment portion 18 may be formed with reliefs 22. As shown in FIG. 3A, the attachment portion 18 may have a plurality of straight transverse reliefs 22a. The relief 22a may permit the conduit 10 to bend laterally in a horizontal plane as shown by arrows 30 in FIG. 3A. To bend the conduit 10 laterally in a horizontal plane, one side of the attachment portions 18 are pushed closer to each other, whereas, the opposed sides of the attachment portions 18 are pulled further away from each other. This allows the conduit 10 to have an arc shaped configuration.

Figure 3B:
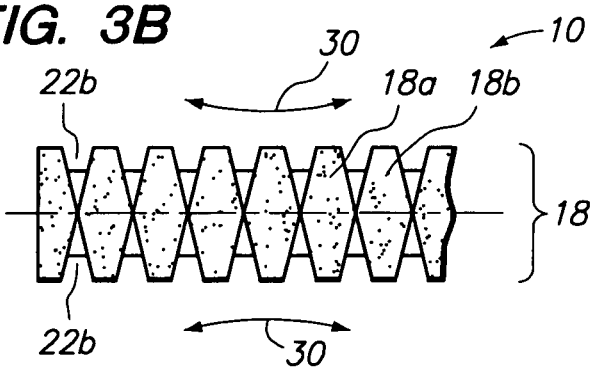
FIG. 3B is a bottom view of an alternative attachment portion of the cable routing conduit.

Referring now to FIG. 3B, the relief 22b may alternatively have a triangularly shaped configuration. This also allows the conduit 10 to bend laterally in the horizontal plane as shown by arrows 30. It is contemplated that the adjacent attachment portions 18 shown in FIG. 3B may not be connected to each other. Rather, the relief 22b may run transversely through the entire attachment portion 18. There may be a small gap between adjacent attachment portions 18.

Figure 3C:
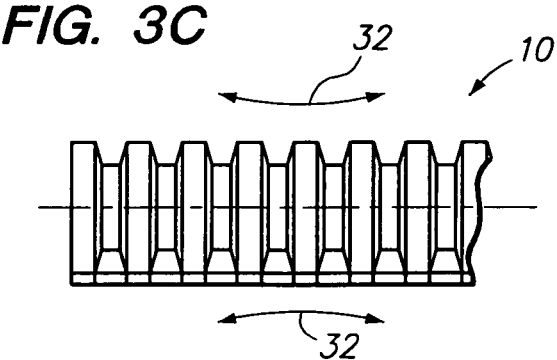
FIG. 3C is a side view of the cable routing conduit shown in FIG. 2 that illustrates vertical bending of the cable routing conduit.
Figure 4:
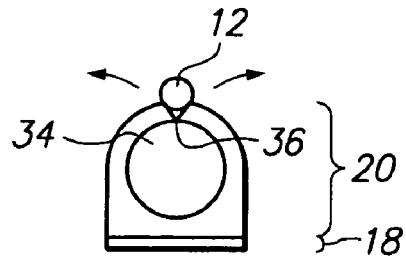
FIG. 4 is an end view of the cable routing conduit shown in FIG. 2 illustrating a v-shaped notch at a slit for allowing the cable to be easily pushed into the cable routing conduit.

The relief 22a or 22b may optionally be incorporated into the attachment portion 18. If reliefs 22a or 22b are not incorporated into the attachment portion 18, then the conduit 10 may not bend in the lateral direction as shown in FIGS. 3A and 3B. Rather, the conduit 10 as shown in FIG. 3C may bend in only the vertical direction as shown by arrow 32 in FIG. 3C. Please note that the embodiments shown in FIGS. 3A and 3B are also vertically bendable in the direction of arrow 32.

Figure 2A:
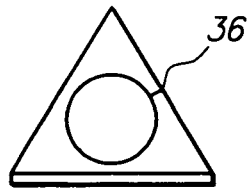
FIG. 2A is an alternative outer cross sectional configuration of the cable routing conduit.
Figure 2B:
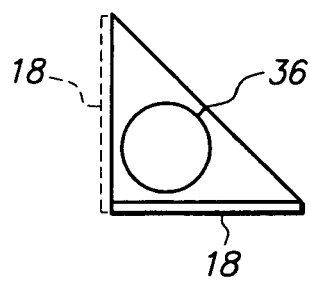
FIG. 2B is a further alternative outer cross sectional configuration of the cable routing conduit.
Figure 2C:
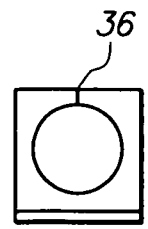
FIG. 2C is a further alternative outer cross sectional configuration of the cable routing conduit.

In an aspect of the conduit 10, the outer cross sectional configuration of the conduit 10 may be circular as shown in FIG. 2, or alternatively, triangular as shown in FIGS. 2A and 2B or square as shown in FIG. 2C. A difference between the triangular outer cross sectional configurations of the conduit 10 shown in FIGS. 2A and 2B is that the triangular configuration shown in FIG. 2A is an equilateral triangle, whereas, the triangular configuration of FIG. 2B is a right triangle. It is contemplated that the non-slitted sides of the triangular shape may be lined with a pressure sensitive adhesive. A benefit of such construction is that the pressure sensitive adhesive formed on the legs of the triangle may be wedged against a corner such as the floor and an upright wall. This provides secure attachment of the conduit 10 against the attachment surface 14. Similarly, two (2) adjacent sides of the square shaped conduit 10 shown in FIG. 2C may be lined with pressure sensitive adhesive and be attached to a corner of a floor and wall in a similar manner compared to the triangularly shaped conduit 10 shown in FIG. 2B for secure attachment of the conduit to the attachment surface 14. Although the above example illustrates the conduit 10 as being wedged against a floor and wall, it is also contemplated that the conduits 10 may be wedged against any type of corner. The corner does not necessarily have to be a right angle but is preferably the same angle as the angle formed between the non-slitted sides of the conduit 10. For example, in FIG. 2A, the two (2) non-slitted sides of the conduit are approximately 60 degrees. Accordingly, these two (2) sides of a conduit 10 may be lined with a pressure sensitive adhesive. The triangularly shaped conduit 10 shown in FIG. 2A may be wedged into a 60 degree corner. The first and second legs or sides of the triangularly shaped conduit 10 may be adhered to the corner walls.

To aid in the insertion and removal of the cable 12 into the hollow portion 34, as shown in FIG. 2, the hollow body 16 (preferably, the cover portion 20) may have a slit 36 extending the entire distance of the longitudinal length of the elongate hollow body 16. However, it is also contemplated that the slit 36 may extend only a partial or substantial length of the longitudinal length of the elongate hollow body 16. To insert the cable 12 into the hollow portion 34 of the conduit 10, the cable 12 is aligned to the slit 36. The cable 12 is then pushed into the slit 36 separating the cover portion 20. To aid in the insertion of the cable 12 between the slit 36 and into the hollow portion 34, the cover portion 20 may have an optional v-shaped notch or bevel (see FIG. 4) extending at least a portion, if not the entire length, of the slit 36. The v-shaped notch provides an initial position of the cable 12 such that the cable 12 may push the cover portion 20 laterally away from each other upon the application of pressure on cable 12. It is also contemplated that the V-shaped notch may be formed only at one or both distal end portions of the elongate hollow body 16. In an aspect of the hollow portion 34, it is contemplated that the hollow portion 34 may be sized and configured to fit only one cable or a plurality of cables.

The attachment portion 18 may be attachable to the attachment surface 14 via a pressure sensitive adhesive. The pressure sensitive adhesive may be lined on the external surface of the attachment portion 18 as shown in FIGS. 3A and 3B. The pressure sensitive adhesive when initially supplied to a customer or a user may be covered with a removable protective liner to prevent dust or other dirt from settling on the pressure sensitive adhesive and rendering the adhesive abilities of the pressure sensitive adhesive inoperable. The liner may be removed from the attachment portion 18 just prior to attachment of the conduit 10 to the attachment surface 14. Alternatively, the body 16 of the conduit 10 may be attached to the attachment surface with a hooks and loops system. In particular, a first part of the hooks and loops system may be attached to the external surface of the attachment portion 18. A second part of the hooks and loops system may be attached to the attachment surface 14. The first and second parts of the hooks and loops system may be attached to the attachment portion 18 and the attachment surface 14 via a pressure sensitive adhesive lined on the first and second parts. To attach the hollow body 16 of the conduit 10 to the attachment surface 14, the first part is engaged to the second part. The first and second parts of the hooks and loops system may respectively be hooks and loops, or vice versa.

Figure 11:
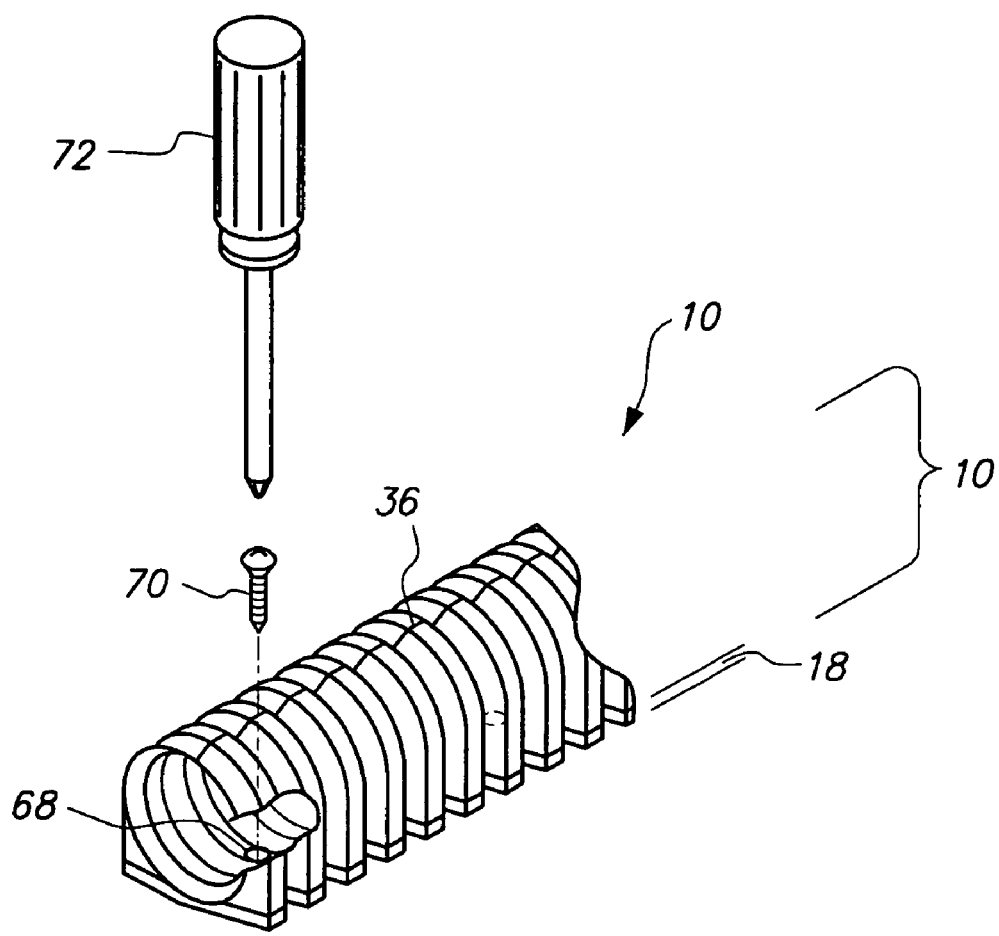
FIG. 11 is a side view of a cable routing conduit attachable to an attachment surface via a plurality of screws insertable through a corresponding plurality of holes in an attachment portion of the conduit.
Figure 12:
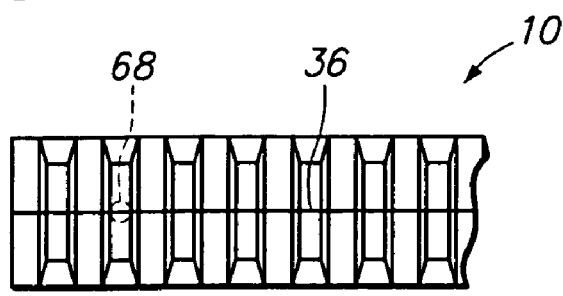
FIG. 12 is a top view of the cable routing conduit shown in FIG. 11 illustrating alignment of the through holes with a slit.

As a further alternative to attaching the attachment portion 18 to the attachment surface 14, the attachment portion 18 of the conduit 10 may have a plurality of through holes 68 along a longitudinal length of the conduit 10, as shown in FIG. 11. The through holes 68 may be equi-distantly spaced apart from each other. Additionally, the through holes 68 may be laterally aligned to the slit 36, as shown in FIG. 12. The slit 36 may be directly above (see FIG. 12) the through holes 68. To attach the conduit 10 to the attachment surface 14, a screw 70 may be inserted through the slit 36 and into the through holes 68. A pilot hole may optionally be formed in the attachment surface 14 to guide the screw 70 into the attachment surface 14. Additionally, a screwdriver 72 may be inserted into the slit 36 and engaged to the screw head to turn the screw 70 such that the screw 70 may engage the attachment surface 14. A plurality of screws 70 may be fed through the through holes 68 and attached to the attachment surface 14 to secure the conduit 10 on the attachment surface 14. Optionally, the attachment portion 18 may be sufficiently thick to handle the use of the fasteners (e.g., screws, etc.) to install or attach the conduit 10 to the attachment surface 14. The through holes 68 may be pre-punched into the attachment portion 18 or the screws 70 may be self threading screws such that the screws 70 form the through holes 68 as the conduit 10 is being attached to the attachment surface 14.

Figure 5:
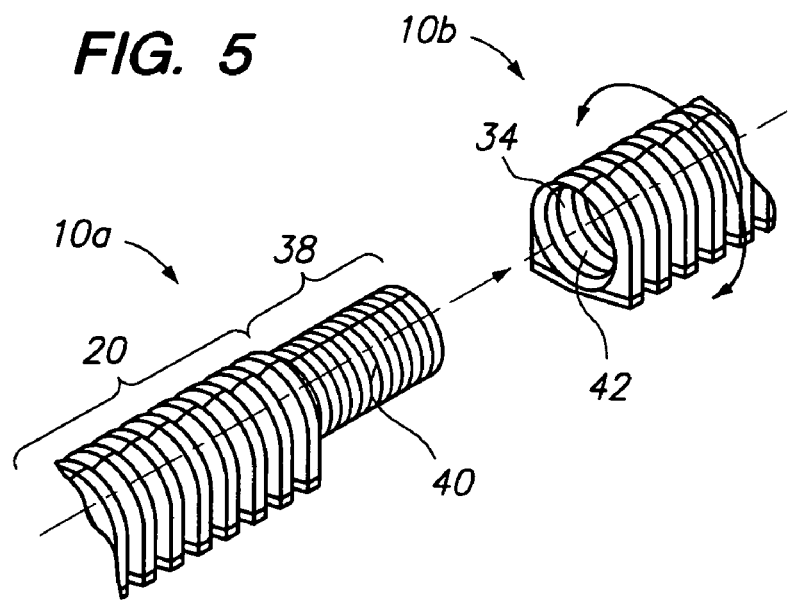
FIG. 5 illustrates a cylindrical nub portion on a distal end of a first cable routing conduit insertable into a distal end of a second cable routing conduit.

Referring now to FIGS. 5-8, various ways of attaching a first conduit 10a to a second conduit 10b are shown. In FIG. 5, the first conduit 10a may have a cylindrical nub portion 38. The cylindrical nub portion 38 may have a matching corrugated or spiral configuration compared to the cover portion 20. More particularly, the outer surface of the cylindrical nub portion 38 may have ridges 40. The ridges 40 may form a spiral shape or a corrugated shape. The inner surface of the second conduit 10b may also have ridges 42. The outer diameter of the cylindrical nub portion 38 may be sized and configured to fit within the hollow portion 34 of the second conduit 10b. The ridges 40 on the cylindrical nub portion 38 may interlock with the ridges 42 on the inner surface of the second conduit 10b. The ridges 40, 42 may have a matching spiral configuration. It is contemplated that the second conduit 10b may be rotated or screwed onto the cylindrical nub portion 38. It is also contemplated that since the first and second conduits 10a, b are somewhat flexible, the cylindrical nub portion 38 may be pushed into the end portion of the second conduit 10b. The ridges 40 of the cylindrical nub portion 38 may deflect and ride over the ridges 42 within the second conduit 10b. The interlocking nature of the ridges 40, 42 may prevent or mitigate disconnection of the first and second conduits 10a, b.

Figure 6:
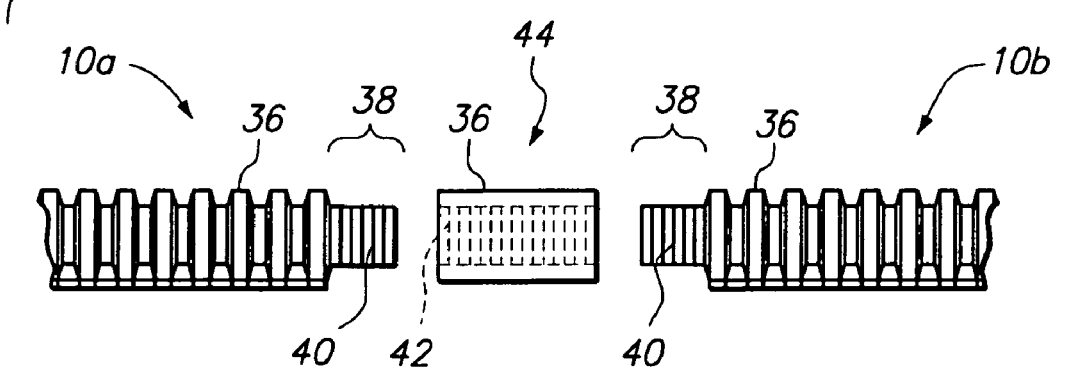
FIG. 6 illustrates a straight fitting for attaching first and second cable routing conduits.
Figure 7:
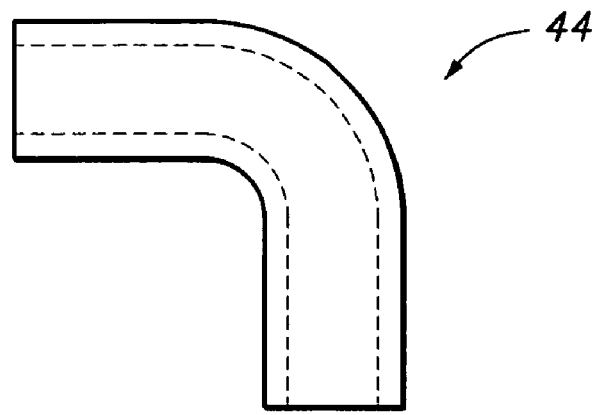
FIG. 7 illustrates an elbow fitting for attaching first and second cable routing conduits.

Referring now to FIG. 6, the first and second conduits 10a, b may both have cylindrical nub portions 38. These cylindrical nub portions 38 of the first and second conduits 10a, b are insertable into a fitting 44. The cylindrical nub portions 38 of the first and second conduits 10a, b may also have ridges 40 having the same characteristics as the ridges 40 described in relation to FIG. 5. The fitting 44 may be a straight fitting. The fitting 44 may also have ridges 42 that may interlock with the ridges 40 of the cylindrical nub portions 38 of the first and second conduits 10a, b. Alternatively, the fitting may be bent as shown in FIG. 7. The fitting shown in FIG. 7 is shown with a 90 degree bend. However, it is contemplated that the fitting may be bent with other angles between 0 and 180 degrees. Similar to the fitting shown in FIG. 6, the fitting, 44 shown in FIG. 7 may also have ridges that may interlock with the ridges 40 of the cylindrical nub portions 38 of the first and second conduits 10a, b.

Figure 8:
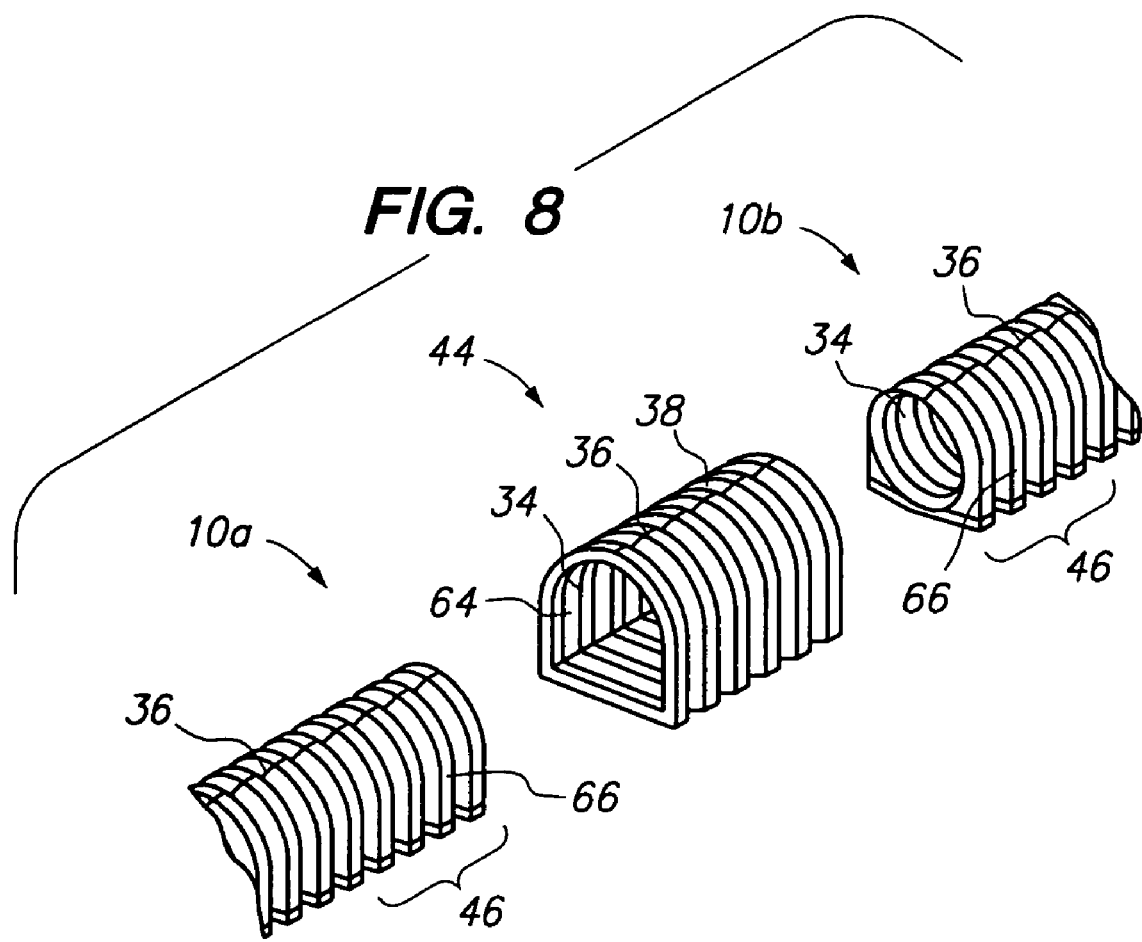
FIG. 8 is a perspective view of a straight fitting sized and configured to receive adjacent flexible conduits.

Referring now to FIG. 8, the first and second conduits 10a, b may not incorporate the cylindrical nub portion 38. In this instance, the fitting 44 may receive the end portions of the first and second conduits 10a, b. More particularly, fitting 44 may have an inner cross sectional configuration which matches the outer cross sectional configuration of the end portion 46 of the first and second conduits 10a, b. By way of example and not limitation, the first conduit 10a may be smaller than the second conduit 10b. Accordingly, the fitting 44 may have different inner cross sectional configurations (not shown) and sizes or the same inner cross sectional configuration and sizes (see FIG. 8). Similar to the other fittings 44 described above, the fitting 44 shown in FIG. 8 may have internal ridges 64 that may interlock with ridges 66 of the first and second conduits 10a, b.

FIGS. 5-8 illustrate various ways of attaching the first conduit 10a to the second conduit 10b. However, it is also contemplated that the first conduit 10a may be aligned to the second conduit 10b. The attachment means of the first and second conduits 10a, b hold the first and second conduits 10a, b to the attachment surface and maintain the alignment of the first and second conduits 10a, b during normal use. Accordingly, in this situation, the various ways of attaching the first and second conduits 10a, b shown and described in relation to FIGS. 5-8 may optionally be incorporated into the first and/or second conduits 10a, b.

In an aspect of the fittings 44 shown and described in FIGS. 6-8, the fitting 44 may also have a slit 36. The slit 36 of the fitting 44 may be aligned to the slits 36 of the first and second conduits 10a, b. This allows the cables 12 to be directly inserted into the adjacent conduits 10a, b via the slits 36. For example, after the assembled flexible conduits 10 are secured to the attachment surface 14, the cable 12 may be inserted into the slit 36 of the attached flexible conduits 10. Since these slits 36 of the flexible conduits 10 are aligned to the slit 36 of the fitting 44, the cable can be pushed into the hollow portion 34 of the fitting 44 and the flexible conduits 10. The installer does not have to continually realign the cable to the slit 36 of an adjacent flexible conduit. Moreover, to remove a cable 12 such as during maintenance, the cable may be easily pulled out of the assembled flexible conduits 10 and reinserted after maintenance.

Figure 9:
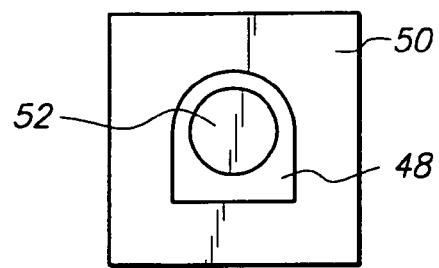
FIG. 9 is an end view of a mandrel and die for forming the conduit.
Figure 10:
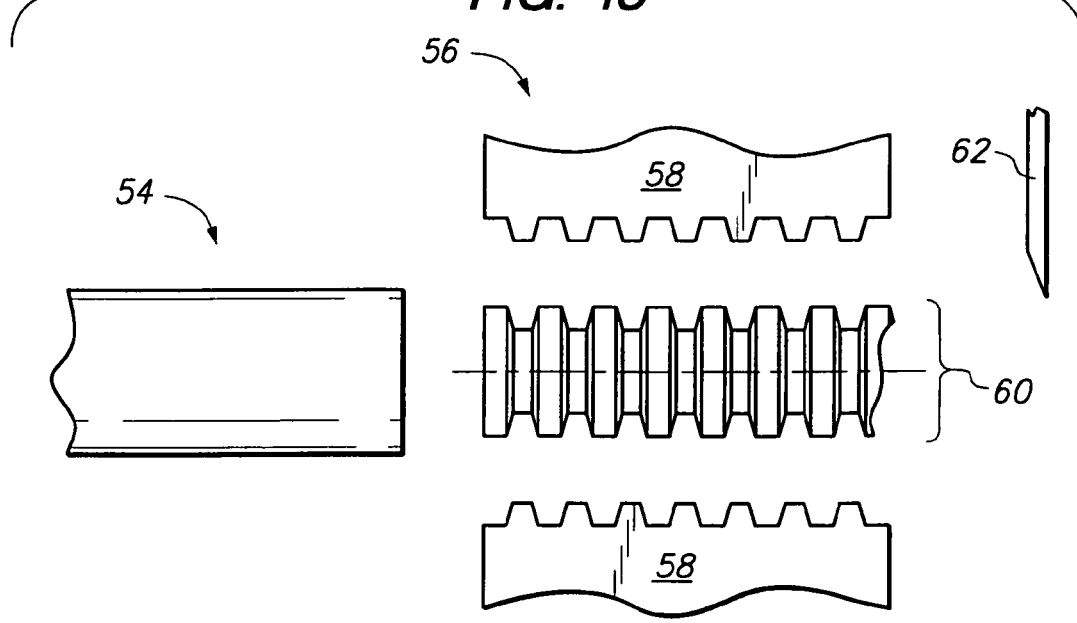
FIG. 10 is a schematic of a molding machine for forming corrugation on a cover portion of the conduit and a knife for forming a slit along a length of the conduit.

Referring now to FIGS. 9 and 10, a method of forming the flexible conduits 10 shown in FIG. 2 is shown. By way of example and not limitation, feedstock (e.g., plastic, etc.) may be forced through an opening 48 of a die 50. To form the hollow portion 34 of the conduit 10, a mandrel 52 may be placed in the center of the die opening 48. After extruding the feedstock through the die 50 and mandrel 52, the extruded feedstock 54 may have a tube configuration without any corrugations, spiral corrugations or reliefs 22a, b. Thereafter, the extruded feedstock 54 may be placed in a molding machine 56. The molding machine 56 may have an outer mold 58 and an inner mold 60. The inner and outer molds 60, 58 may have corresponding peeks and valleys that form the corrugated configuration of the cover portion 20 of the flexible conduit 10. Moreover, as discussed above, the flexible conduit 10 may have a generally flat attachment portion 18. The inner and outer molds 60, 58 of the molding machine 56 may have corresponding generally flat surfaces that match the generally flat attachment portion 18. After the extruded feedstock 54 has been processed through the molding machine 56, the molded feedstock may have a cover portion 20 that is corrugated. Also, the attachment portion 18 may be generally flat. Thereafter, the molded feedstock may be cut with a knife 62 to form the slit 36 and the optional reliefs 22a, b. These method steps form the flexible conduit 10 as shown in FIG. 2.

It is also contemplated that the other types of conduits 10 and the fittings 44 discussed herein may also be formed with the above-described manufacturing process.

During use, a plurality of cables 12 may extend between the source and destination. To neatly organize the cables 12 between the source and destination, the conduits 10 may be attached to the attachment surface 14 prior to inserting the cable 12 into the conduits 10. By way of example and not limitation, the attachment portion 18 of the conduits 10 may be attached to the attachment surface 14. If the conduit 10 needs to be lengthened or shortened, the conduit 10 is lengthened or shortened prior to attachment of the attachment portion 18 to the attachment surface 14. The conduit 10 may be vertically or laterally bent to match the requirements of the cable's environment. For example, if the cable 12 runs from the floor to a tabletop, the conduit 10 may be bent upward or vertically such that the cables 12 may run upward along a leg of the table or a wall adjacent the table. The conduits 10 may be routed from the source to the destination by vertically or laterally bending the flexible conduit 10 to match the contour of the attachment surface(s) 14. As a further tool to aid in the routing of the cable from the source to the destination, two conduits 10 may be attached to each other such as with a straight fitting or an elbow fitting. The fittings 44 allow a user to route cables a long distance. As the conduits 10 are attached to the attachment surface 14, the slits of each of the conduits 10 and the fitting 44 may be aligned to each other. After all the conduits 10 are attached to the attachment surface 14, the cable 12 may then be pushed into the conduit 10 via the slit 36. Since the slits 36 are aligned to each other between each of the conduits 10, the user need only push the cable 12 into the conduit 10. It is also contemplated that the cables 12 may be inserted into the conduits 10 before attaching the conduits 10 to the attachment surface 14.

The above description is given by way of example, and not limitation. Given the above disclosure, one skilled in the art could devise variations that are within the scope and spirit of the invention disclosed herein. Further, the various features of the embodiments disclosed herein can be used alone, or in varying combinations with each other and are not intended to be limited to the specific combination described herein. Thus, the scope of the claims is not to be limited by the illustrated embodiments.

What is claimed:

1. A cable routing conduit for organizing electrical cables, the conduit comprising:

an elongate hollow body defining a generally flat attachment portion extending a substantial length of the elongate hollow body and a body wall defining an elongate opening extending a substantial length of the elongate hollow body, the elongate opening sized to fit at least one electrical cable, the body wall defining a plurality of corrugations, the generally flat attachment portion having a plurality of reliefs to permit lateral bending of the elongate hollow body to conform the elongate hollow body to an attachment surface adjacent the electrical cable, the attachment portion defining opposing lateral edges and including a plurality of attachment elements, wherein individual attachment elements are separated by a relief extending transversely across the attachment portion from one lateral edge to the other lateral edge to facilitate lateral bending of the elongate hollow body; and an adhesive lined on the attachment portion for selectively attaching the elongate hollow body to the attachment surface.

2. The conduit of claim 1 wherein the adhesive is a pressure sensitive adhesive lined on the generally flat attachment portion for selectively attaching the elongate hollow body to the attachment surface.

3. The conduit of claim 1 wherein the elongate opening is diametrically opposed to the attachment portion.

4. The conduit of claim 1 wherein an outer cross sectional configuration of the hollow body is circular, triangular or square.

5. The conduit of claim 1 wherein an outer cross sectional configuration of the hollow body has a plurality of flat sides and the adhesive is lined on two adjacent sides.

6. A cable routing conduit for organizing electrical cables, the conduit comprising:

an elongate hollow body defining a generally flat attachment portion extending a substantial length of the elongate hollow body and an elongate opening extending a substantial length of the elongate hollow body, a cavity of the elongate hollow body sized to fit at least one electrical cable, the generally flat attachment portion having a plurality of reliefs to permit lateral bending of the elongate hollow body to conform the elongate hollow body to an attachment surface adjacent the electrical cable, wherein a distal end portion of a first hollow elongate body is insertable into a distal end portion of a second hollow elongate body, the distal end portions of the first and second hollow bodies having ridges that interlock with each other upon insertion of the first body into the second body; and an adhesive lined on the attachment portion for selectively attaching the elongate hollow body to the attachment surface.

7. The conduit of claim 6 wherein the distal end portion of the first body is a cylindrical nub portion.

8. The conduit of claim 6 wherein the ridges are threads.

9. A cable routing conduit for organizing electrical cables, the conduit comprising:
- a first elongate hollow body defining a generally flat attachment portion extending a substantial length of the elongate hollow body and an elongate opening extending a substantial length of the elongate hollow body, a cavity of the elongate hollow body sized to fit at least one electrical cable, the generally flat attachment portion having a plurality of reliefs to permit lateral bending of the elongate hollow body to conform the elongate hollow body to an attachment surface adjacent the electrical cable;
- a fitting attached to a distal end portion of the first elongate body, the fitting being attachable to a distal end portion of a second elongate body, the fitting providing a passageway between hollow portions of the first and second elongate bodies; and
- an adhesive lined on the attachment portion for selectively attaching the elongate hollow body to the attachment surface.

10. The conduit of claim 9 wherein slits are formed in the first and second bodies and the fitting, and the slits are aligned to each other.

11. The conduit of claim 9 wherein the fitting is bent or straight.

12. A cable routing conduit for organizing electrical cables, the conduit comprising:
- an elongate hollow body defining a generally flat attachment portion extending a substantial length of the elongate hollow body and an elongate opening extending a substantial length of the elongate hollow body, a cavity of the elongate hollow body sized to fit at least one electrical cable, the generally flat attachment portion permitting only vertical bending of the elongate hollow body;
- an attachment means on the attachment portion for selectively attaching the elongate hollow body to the attachment surface; and
- a connector fitting connectable to the elongate hollow body, the connector fitting being sized and configured to connect the elongate hollow body to an adjacent elongate hollow body to provide a passageway between hollow portions of the adjacent elongate bodies.

13. A cable routing conduit for organizing electrical cables, the conduit comprising:
- an elongate hollow body defining a generally flat attachment portion extending a substantial length of the elongate hollow body and an elongate opening extending a substantial length of the elongate hollow body, a cavity of the elongate hollow body sized to fit at least one electrical cable, the generally flat attachment portion defining opposing lateral edges and includes a plurality of attachment elements, wherein individual attachment elements are separated by a relief extending transversely across the attachment portion from one lateral edge to the other lateral edge to facilitate lateral bending of the elongate hollow body; and
- an attachment means on the attachment portion for selectively attaching the elongate hollow body to the attachment surface.

14. A cable routing conduit for organizing electrical cables, the conduit comprising:
- a first elongate hollow body defining a generally flat attachment portion extending a substantial length of the first elongate hollow body and an elongate opening extending a substantial length of the first elongate hollow body, a plurality of through holes formed in the attachment portion and generally aligned to the elongate opening, a cavity of the first elongate hollow body sized to fit at least one electrical cable, the generally flat attachment portion permitting only vertical bending of the elongate hollow body;
- wherein a distal end portion of the first hollow elongate body is insertable into a distal end portion of a second hollow elongate body, the distal end portions of the first elongate hollow body having ridges that interlock with the second elongate hollow body upon insertion of the first elongate hollow body into the second elongate hollow body.

15. The conduit of claim 14 wherein the through holes are aligned to the elongate opening for allowing access to the fastener via the elongate opening.

16. The conduit of claim 1 wherein each relief defines a triangular shape.

17. A cable routing conduit for organizing electrical cables, the conduit comprising:
- an elongate hollow body defining a generally flat attachment portion extending a substantial length of the elongate hollow body and a body wall defining an elongate opening extending a substantial length of the elongate hollow body, the elongate opening sized to fit at least one electrical cable, the body wall defining a plurality of corrugations, the generally flat attachment portion having a plurality of reliefs to permit lateral bending of the elongate hollow body to conform the elongate hollow body to an attachment surface adjacent the electrical cable;
- an adhesive lined on the attachment portion for selectively attaching the elongate hollow body to the attachment surface; and
- a connector fitting connectable to the elongate hollow body, the connector fitting being sized and configured to connect the elongate hollow body to an adjacent elongate hollow body to provide a passageway between hollow portions of the adjacent elongate bodies.

* * * * *